United States Patent
Franks (10) Patent No.: US 9,298,765 B2
(45) Date of Patent: *Mar. 29, 2016

(54) APPARATUS AND METHOD FOR HANDLING PARTIALLY INCONSISTENT STATES AMONG MEMBERS OF A CLUSTER IN AN ERRATIC STORAGE NETWORK

(71) Applicant: Peaxy, Inc., San Jose, CA (US)

(72) Inventor: John Franks, San Jose, CA (US)

(73) Assignee: Peaxy, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,428

(22) Filed: Jun. 23, 2014

(65) Prior Publication Data
US 2014/0304237 A1 Oct. 9, 2014

Related U.S. Application Data

(63) Continuation of application No. 13/780,952, filed on Feb. 28, 2013, now Pat. No. 8,793,527.

(51) Int. Cl.
*G06F 11/00* (2006.01)
*G06F 17/30* (2006.01)
*H04L 29/08* (2006.01)
*G06F 3/06* (2006.01)

(52) U.S. Cl.
CPC .......... *G06F 17/30371* (2013.01); *G06F 3/067* (2013.01); *H04L 67/1097* (2013.01)

(58) Field of Classification Search
CPC .......... G06F 17/30371; G06F 11/2097; G06F 11/1474; G06F 17/30575; G06F 11/1658; G06F 11/2082; G06F 3/067; G06F 11/2064; G06F 11/1471; G06F 11/1662; G06F 11/2076; G06F 11/2094; G06F 17/30424; G06F 9/465; G06F 11/2007; H04L 41/0654; H04L 67/1095; H04L 67/1097
See application file for complete search history.

(56) References Cited

U.S. PATENT DOCUMENTS

| | | | |
|---|---|---|---|
| 7,500,020 B1 * | 3/2009 | Kabra et al. | 709/248 |
| 2002/0078174 A1 * | 6/2002 | Sim et al. | 709/219 |
| 2002/0129134 A1 * | 9/2002 | Leighton et al. | 709/223 |
| 2004/0078637 A1 * | 4/2004 | Fellin et al. | 714/6 |

(Continued)

FOREIGN PATENT DOCUMENTS

WO   WO 2012/162173 A2   11/2012   .............. G06F 15/16

OTHER PUBLICATIONS

International Searching Authority, International Search Report and Written Opinion of PCT/US2013/074598, mailed Mar. 27, 2014, 11 pages.

*Primary Examiner* — Jason Bryan
(74) *Attorney, Agent, or Firm* — Sunstein Kann Murphy & Timbers LLP (57) ABSTRACT

A method, for handling partially inconsistent states among members of a cluster in an erratic storage network that responds to requests from a client, includes assigning a unique commit identifier corresponding to each successive modification of state of the cluster when an update request has been successfully completed and correlating an incoming request to a given member of the cluster with any commit identifiers necessary to satisfy the request. The method further includes detecting, on the incoming request to the given member of the cluster, whether the commit identifiers necessary to satisfy the request have been applied to the given member, and processing the incoming request based on whether the commit identifiers necessary to satisfy the request have been applied to the given member. Operation of the members can be asynchronous.

5 Claims, 7 Drawing Sheets

(56) References Cited

U.S. PATENT DOCUMENTS

| | | | |
|---|---|---|---|
| 2006/0253504 A1* | 11/2006 | Lee et al. | 707/203 |
| 2007/0022264 A1 | 1/2007 | Bromling et al. | 711/162 |
| 2009/0193059 A1* | 7/2009 | Wall et al. | 707/201 |
| 2010/0082540 A1 | 4/2010 | Isaacson et al. | 707/624 |

* cited by examiner

APPARATUS AND METHOD FOR HANDLING PARTIALLY INCONSISTENT STATES AMONG MEMBERS OF A CLUSTER IN AN ERRATIC STORAGE NETWORK

RELATED APPLICATIONS

This application is a continuation of U.S. application Ser. No. 13/780,952, entitled "Apparatus and Method for Handling Partially Inconsistent States Among Members of a Cluster in an Erratic Storage Network" and filed Feb. 28, 2013, which is hereby incorporated by reference in its entirety.

BACKGROUND ART

Storage systems can be implemented using physical or virtual computers that communicate with one another over one or more computer networks. The physical and/or virtual computers are organized into clusters, and each cluster manages a different section of the storage space (i.e., a section of the dataspace). Each member stores a local copy of the cluster's storage space such that the members collectively provide redundancy for the system.

BACKGROUND ART

Storage systems can be implemented using physical or virtual computers that communicate with one another over one or more computer networks. The physical and/or virtual computers are organized into clusters, and each cluster manages a different section of the storage space (i.e., a section of the dataspace). Each member stores a local copy of the cluster's storage space such that the members collectively provide redundancy for the system.

When members are distributed across computer networks, members may become unavailable or unresponsive, or become available and responsive again, according to the computer networks' functionality. Members' local storage spaces may become out of date while they are unavailable, and such availability may also increase latency for processing client requests to unacceptable magnitudes.

SUMMARY OF THE EMBODIMENTS

In a first embodiment of the present invention, there is provided a method for handling partially inconsistent states among members of a cluster in an erratic storage network that responds to requests from a client. The method includes assigning a unique commit identifier corresponding to each successive modification of state of the cluster when an update request has been successfully completed. The method further includes correlating an incoming request to a given member of the cluster with any commit identifiers necessary to satisfy the request. The method also includes detecting, on the incoming request to the given member of the cluster, whether the commit identifiers necessary to satisfy the request have been applied to the given member, and if the commit identifiers necessary to satisfy the request have been applied to the given member, then satisfying the incoming request; and if the commit identifiers necessary to satisfy the request have not been applied to the given member, then performing at least one of the following processes: (i) asynchronously causing one or more other members of the cluster, having commit identifiers necessary to satisfy the request, to satisfy the request; (ii) asynchronously causing one or more other members to provide to the given member the missing commit identifiers to satisfy the request, so that the given member can satisfy the request; and (iii) waiting until the given member has been caused to receive the missing commit identifiers to satisfy the request, so that the given member can satisfy the request.

In another embodiment of the present invention, there is provided a method for handling partially inconsistent states among members of a cluster in an erratic storage network that responds to requests from a client. The method of this embodiment includes assigning a unique commit identifier corresponding to each successive modification of state of the cluster when an update request has been successfully completed. The method further includes correlating an incoming request to a given member of the cluster with any commit identifiers necessary to satisfy the request; detecting, on the incoming request to the given member of the cluster, whether the commit identifiers necessary to satisfy the request have been applied to the given member; and if the commit identifiers necessary to satisfy the request have been applied to the given member, but the given member cannot efficiently satisfy the request, then asynchronously causing one or more other members of the cluster, having commit identifiers necessary to satisfy the request, to satisfy the request.

In a further embodiment related to the first embodiment, wherein if the commit identifiers necessary to satisfy the request have not been applied to the given member, the method further includes performing both (i) asynchronously causing one or more other members of the cluster, having commit identifiers necessary to satisfy the request, to satisfy the request; and (ii) asynchronously causing one or more other members to provide to the given member the missing commit identifiers to satisfy the request, so that the given member can satisfy the request.

In another embodiment related to the first embodiment, wherein if the commit identifiers necessary to satisfy the request have not been applied to the given member, the method further includes using a set of selection criteria to determine which one or more of processes (i), (ii), and (iii) shall be performed. Optionally, the set of selection criteria includes one or more of the following criteria associated with the given member of the cluster or any other member of the cluster: storage unit activity, processor load, network bandwidth available, memory available, thermal conditions, and electrical power consumption, and configuration settings.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "cluster member" means a logical computer configured to operate as a unit in a cluster of logical computer systems that cooperatively carry out some or all functions of a server in responding to storage requests from a client.

A "client" of a storage cluster may be optionally included as a member of the cluster.

A "logical" computer system can be either a real computer system or a virtual computer system. When a logical computer system is a virtual computer system, the virtual computer system is established by running virtualizing software in a real computer system.

A "storage unit" means any physical or virtual device or portion thereof configured to store data in a non-volatile manner, including but not limited to an actual or virtual disk drive, an actual or virtual SSD, and an actual or virtual backed-up RAM. When a storage unit is implemented as a virtual device, the virtual device is implemented as a part of a virtual computer system, which, in turn, is established by running virtualizing software in a real computer system.

In general overview, storage systems can be implemented using physical or virtual computer systems that communicate with one another over one or more computer networks. The physical and/or virtual computer systems are organized into clusters, and each cluster is configured to handle a subset of tasks in responding to storage requests by a client. In one embodiment, for example, each cluster may manage a different section of the storage space (i.e., a section of the dataspace) that is available to the client. Optionally, each member may store a local copy of data in the dataspace allocated to the cluster such that the members collectively provide redundancy for the system.

When members of a given cluster are distributed across a computer network, various factors, including breaches in reliability of devices and in communication between devices, may cause the logical state of a given member to be inconsistent with the logical state of other members in the cluster, a condition that threatens useful operation of the cluster Specifically, if a communication breach, for example, renders a member unavailable, the cluster may nevertheless continue receiving client storage requests, including write requests that, if satisfied, would change data in the cluster's storage space. When the member becomes available again to the cluster, the member's local storage space may be out of date relative to other members of the cluster and thus incapable of servicing some of the client requests.

Further, when a cluster receives a write request, the cluster may require data to be stored redundantly among the members. In a situation wherein the cluster is configured to wait until all of its members have confirmed that they have completed writing the data to their local storage spaces before the cluster indicates to the client that the write request has been completed, and the members are available only erratically, the result may be unacceptable latencies in responding to client requests. Various embodiments described herein provide alternative scenarios under which strict synchronism of all cluster members is not required and, further, in which some reliability can be traded off in favor of a desired enhancement in performance.

Figure 1:
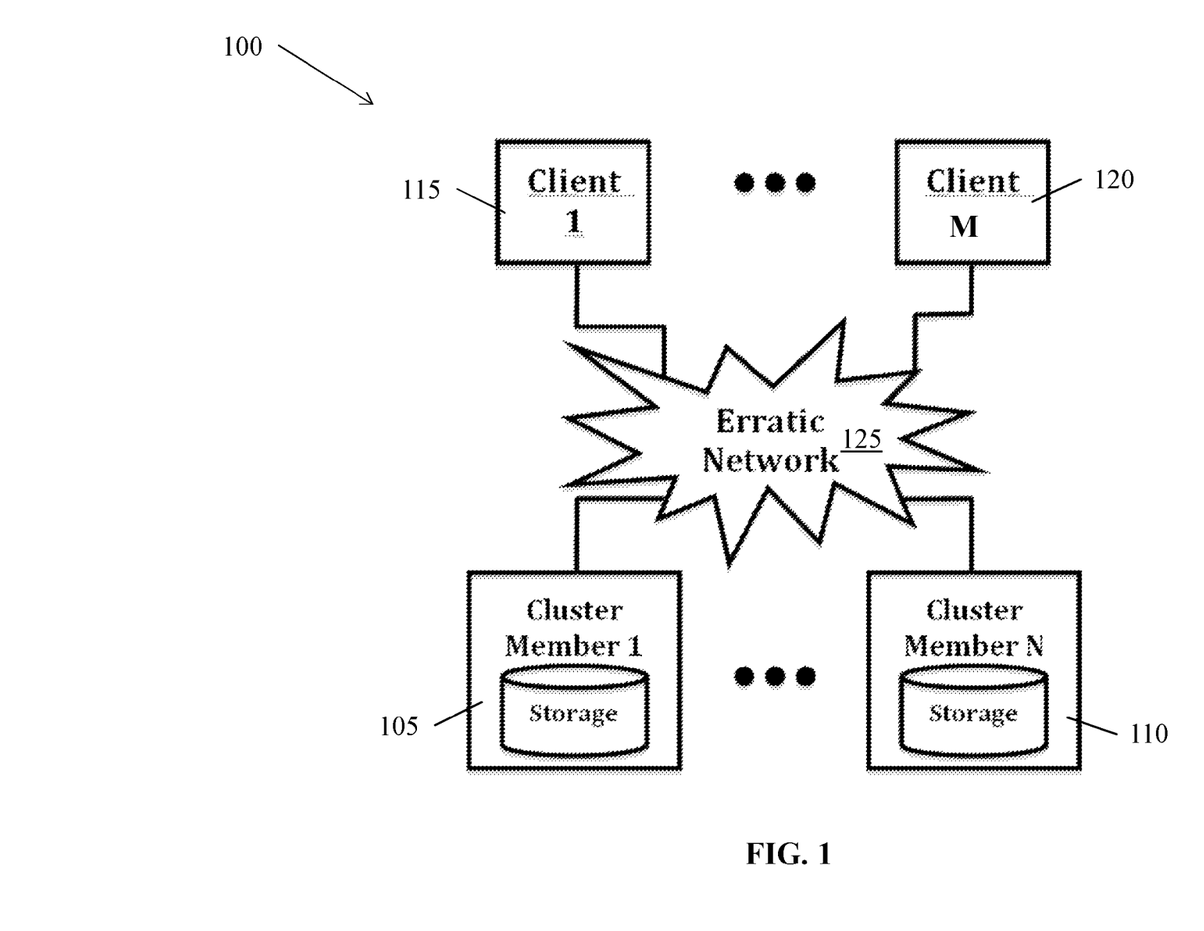
FIG. 1 is an exemplary block diagram of a cluster in a storage system.

FIG. 1 is an exemplary block diagram of a cluster 100 in a storage system according to an embodiment of the present invention. The cluster has members 1 . . . N, N≥2, where member 1 is shown as item 105 and member N is shown as item 110. The cluster processes storage requests received over erratic network 125 from clients 1 . . . M, M≥1, where client 1 is shown as item 115 and client M is shown as item 120. Data stored by the cluster is in fact stored redundantly by each of the members of the cluster. In various embodiments, one or more of the clients might also function as a storage member. The members 105 . . . 110 besides communicating with clients 115 . . . 120 over the erratic network 125, also communicate with one another over the erratic network 125. Because the computer network 125 is erratic, any member can become unexpectedly disconnected from and thus unavailable to the other members. Further, unavailable members can become available again in an unpredictable manner.

In various embodiments of the cluster 100, one member may be configured to act as the primary member and the other members configured to act as secondary members. When a write request is directed to the cluster, the primary member applies the write request to its local storage space and coordinates the other members to do the same, thereby ensuring that the data in the write request is redundantly stored. When a read request is directed to the cluster, the request may be handled by any member in the cluster, since the read does not require a change of state in data stored by the cluster.

When the cluster receives a write request (also referred to herein as a "commit write"), the cluster assigns a commit identifier to the request. The commit identifiers are sequential to assure that the write requests are processed in the order in which the cluster received the write requests. Each commit identifier therefore becomes associated with a logical state of the cluster's storage space. When a member applies a write request, the member stores the request's commit identifier in its log. In this manner, the presence and/or absence of commit identifiers in this log indicate the logical state of a given cluster member.

As one example, the cluster receives a request to write Value1 to Address1. The primary member assigns the commit identifier x0001 to the write request. The cluster then receives, in order, a request to write Value2 to Address2, a request to write Value 3 to Address1, and a request to write Value 4 to Address1. The primary member 105 assigns the commit identifier x0002 to the request to write Value2 to Address2. The primary member 105 assigns commit identifiers x0003 and x0004, respectively, to the requests to write Value 3 and Value 4 to Address 1. Thus, each of the commit identifiers x0001, x0003, and x0004 is associated with a different logical state with respect to the value stored in Address 1, namely, Value1, Value3, and Value 4. Likewise, commit identifier x0002 is associated with the logical state of having Value2 stored in Address2.

Let us assume in this example that one of the secondary cluster members may have been continuously capable of communication with the primary member when the primary member cluster sent its members all of the write requests. Thus, this secondary member received the write requests associated with commit identifiers x0001, x0002, x0003, and x0004. The member applied the write requests associated with Address1 to its local storage space to ultimately store Value 4, and stored the commit identifiers x0001, x0003, and x0004 in its log. The member applied the write request associated with Address2 to its local storage space to store Value 2, and stored the commit identifier x0002 in its log.

Let us assume that another secondary member in the cluster experienced a communication breach when the primary member sent to secondary members the write requests associated with commit identifiers x0002 and x0004. The member applied the write requests it received to its local storage space to store Value 3 in its copy of Address 1, and stored the commit identifiers x0001 and x0003 in its log. Because the member did not receive the write request associated with the commit identifier x0004, its data for Address1 is out of date, although the presence of commit identifier x0003 in the member's log records the logical state with respect to this entry in the storage space. Because the member did not receive the write request associated with the commit identifier x0002, the data stored in its copy of Address2 is not meaningful. Further, the absence of commit identifier x0002 from the member's log indicates the out of date logical state with respect to this entry in the storage space.

To handle this kind of problem, in some embodiments, as the primary member receives write requests, the primary member stores, for each entry in the storage space, the commit identifiers associated with write requests necessary to attain the current logical state for the entry. Accordingly, the primary member may associate commit identifiers x0001, x0003, and x0004 with Address1 and associate commit identifier x0002 with Address 2. The primary member therefore can determine based on this information that Address1 in a cluster member's local storage space is in a current logical state if the member has applied write requests associated with commit identifiers x0001, x0003, and x0004. Likewise, the primary member can determine that Address2 in a cluster member's local storage space is in a current logical state if the member has applied the write request associated with commit identifier x0002.

In some embodiments, the primary member stores only the most recent commit identifier for each entry. When the primary member receives a subsequent write request, the primary member overwrites the commit identifier associated with the storage space entry with the commit identifier assigned to the newly received write request. For example, the primary member may have stored information associating commit identifier x0003 with Address1. When the primary member receives a new write request to update Address1, the primary member assigns commit identifier x0004 to the request and writes information associating commit identifier x0004 with Address1 over the information associating commit identifier x0004 with the same entry.

In various embodiments, when the primary member receives a write request, the primary member assigns a commit identifier to the client request. The primary member correlates the request with a storage space entry by which the request can be carried out. When the primary member sends the write request to the secondary members in the cluster, the primary member includes either the most recent commit identifier correlated with the storage space entry or all of the commit identifiers. When a secondary member receives the write request, the secondary member compares its log of commit identifiers to the commit identifier(s) correlated with the request. Based on the comparison, the secondary member determines whether its local storage space is in a logical state such that the secondary member can accurately apply the request.

Embodiments of the present invention are pertinent to the subject matter of U.S. application Ser. No. 13/759,799, entitled "Software-Defined Network Attachable Storage System and Method" and filed Feb. 5, 2013, which is hereby incorporated by reference in its entirety. In that application are described, among other things, embodiments of a Hyperfiler, which may include one or more "namespace hyperservers" and one or more "dataspace hyperservers". A client computer system seeking to access data in the Hyperfiler will, in various embodiments, make a hash of the pathname of a desired storage request and consult a hash table stored in the client's memory to determine the namespace hyperserver from which to get a handle for making the request to a corresponding dataspace hyperserver. Each dataspace hyperserver is typically implemented as a cluster of logical computer systems, where a "logical computer system" is as defined hereinabove. Each cluster of logical computer systems constituting a dataspace hyperserver in the Hyperfiler may be operated in the manner of the cluster of FIG. 1 herein.

Figure 2:
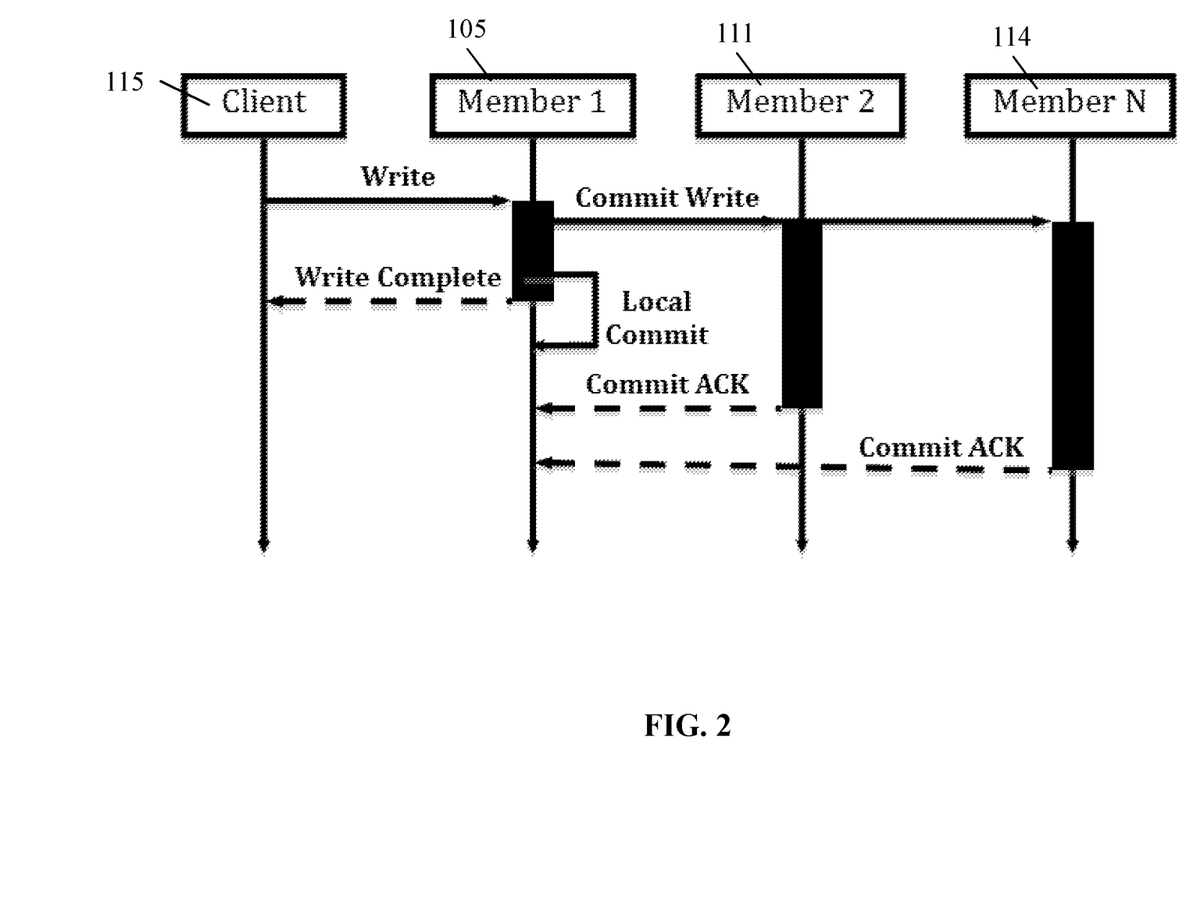
FIGS. 2-4 are exemplary diagrams depicting asynchronous processing of a write request by the cluster of FIG. 1 in accordance with different embodiments of the present invention.

FIG. 2 is an exemplary diagram depicting asynchronous processing of a write request by the cluster of FIG. 1 in accordance with an embodiment of the present invention. In this embodiment, a client 115 sends a write request to the cluster. The primary member 105 (shown as Member 1 in FIG. 2) assigns a commit identifier to the write request. In some embodiments, the primary member 105 determines this commit identifier by incrementing the value of the most recent commit identifier. For example, the primary member 105 may increment the commit identifier from x0028 to x0029 and assign the commit identifier "x0029" to the write request. The primary member 105 stores the commit identifier and the write request in its log. Next, the primary member 105 sends a copy of the write request (i.e., "Commit Write" in FIG. 2) and its commit identifier to all of the secondary members (identified as Member 2 and Member N in FIG. 2) in the cluster. The primary Member 1 begins to apply the write request to its own logical storage space, modifying the data therein (i.e., implementing a "Local Commit" as shown in FIG. 2). In this embodiment, once the primary Member 1 begins writing data to its local storage space, it sends a message to the client indicating that the writing for the request has been completed (marked "Write Complete" in FIG. 2). Unlike a case involving synchronous processing of a client write request, in this embodiment, the primary Member 1 reports the writing complete even before it has completed its own write to local storage. Meanwhile, each secondary member (namely Member 2 and Member N) is reporting to the primary Member 1 when the write request has been completed by that secondary member (such report marked "Commit Ack" in FIG. 2). Because in this embodiment, the primary member reports, to the client, completion of the write request before the write has been completed even by the primary, the cluster can service new client requests with very low latency.

Figure 3:
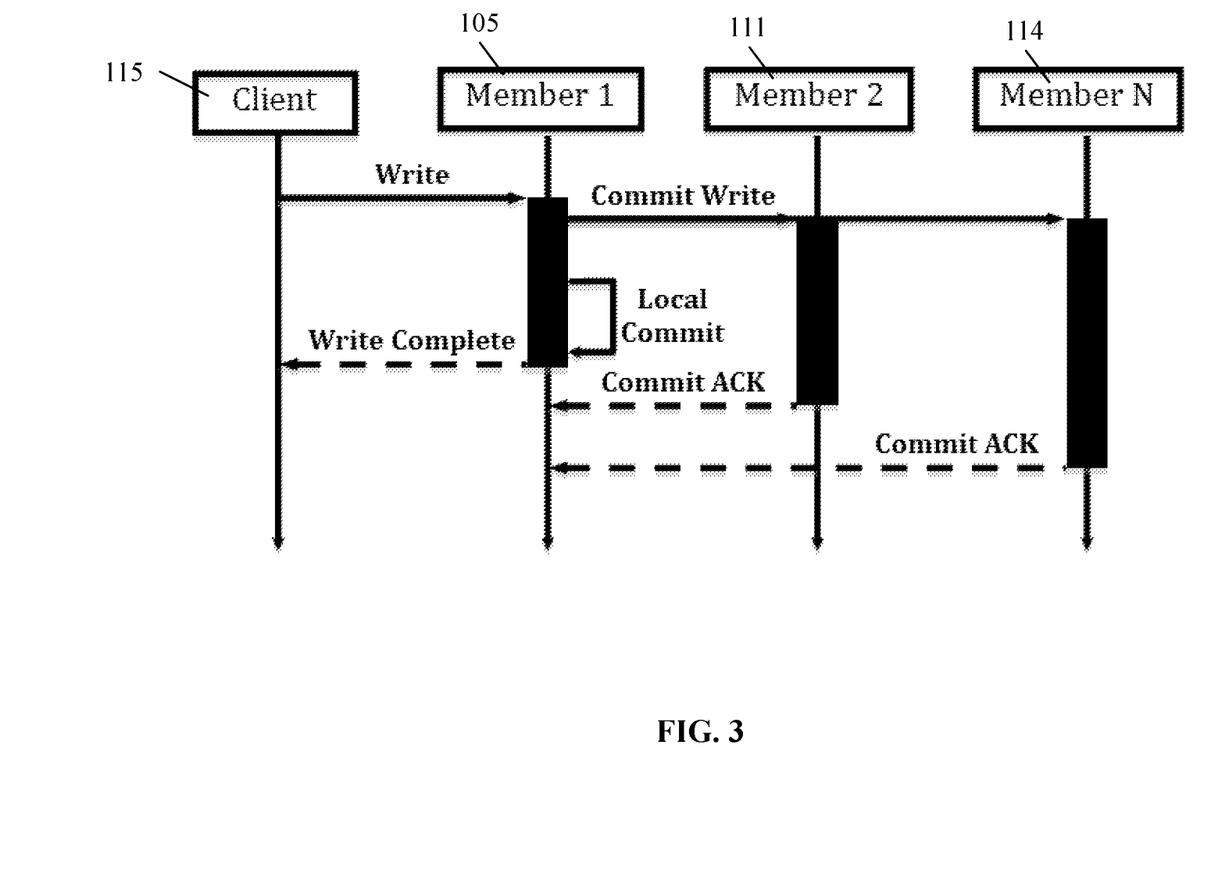

FIG. 3 presents another embodiment of asynchronous processing of a write request by the cluster of FIG. 1. In this embodiment, the processing is similar to that of FIG. 2, but the primary Member 1 does not report to the client that the write request has been satisfied (marked "Write Complete" in FIG. 3) until after Member 1 has stored in its own local storage the data from the write request. This protocol avoids the risk that Member 1 encounters a problem in storing the data, while still providing reduced latency compared to the latency that would result by waiting, to report to the client completion of the write request, until the secondary Member 2 and Member N have acknowledged, to the primary Member 1, completion of writing by the secondaries.

Figure 4:
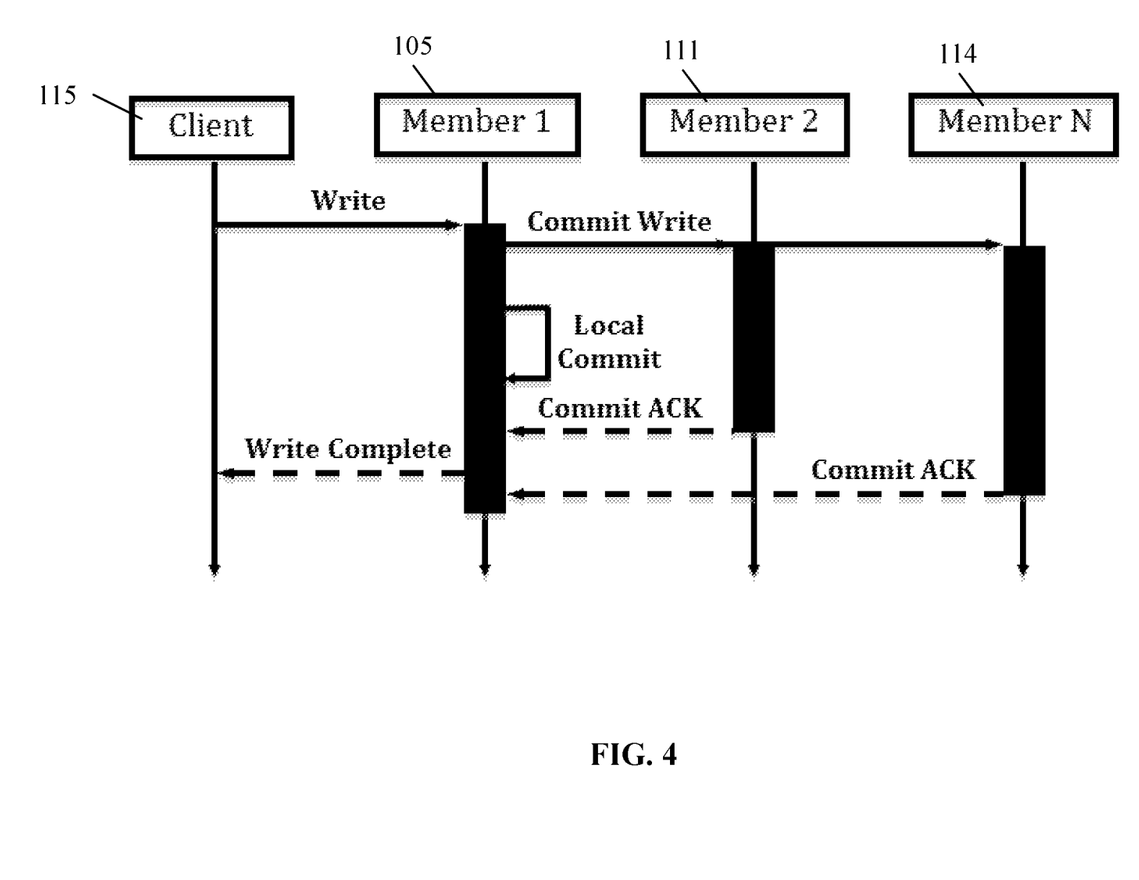

FIG. 4 presents yet another embodiment of asynchronous processing of a write request by the cluster of FIG. 1. In this embodiment, the processing is similar to that of FIG. 3, but the primary Member 1 does not report to the client that the write request has been satisfied (marked "Write Complete" in FIG. 4) until after (1) Member 1 has stored in its own local storage the data from the write request and (2) Member 1 has received an acknowledgment from one of the secondary members ("Commit Ack" in FIG. 4, in this case from Member 2) that the secondary member has successfully applied the write request. This protocol provides greater safety and reliability (at the expense of latency) than the protocol of FIG. 3, since the data from the request is stored in two locations (in Member 1 and Member 2), before the client is notified that the write request has been carried out.

Figure 5:
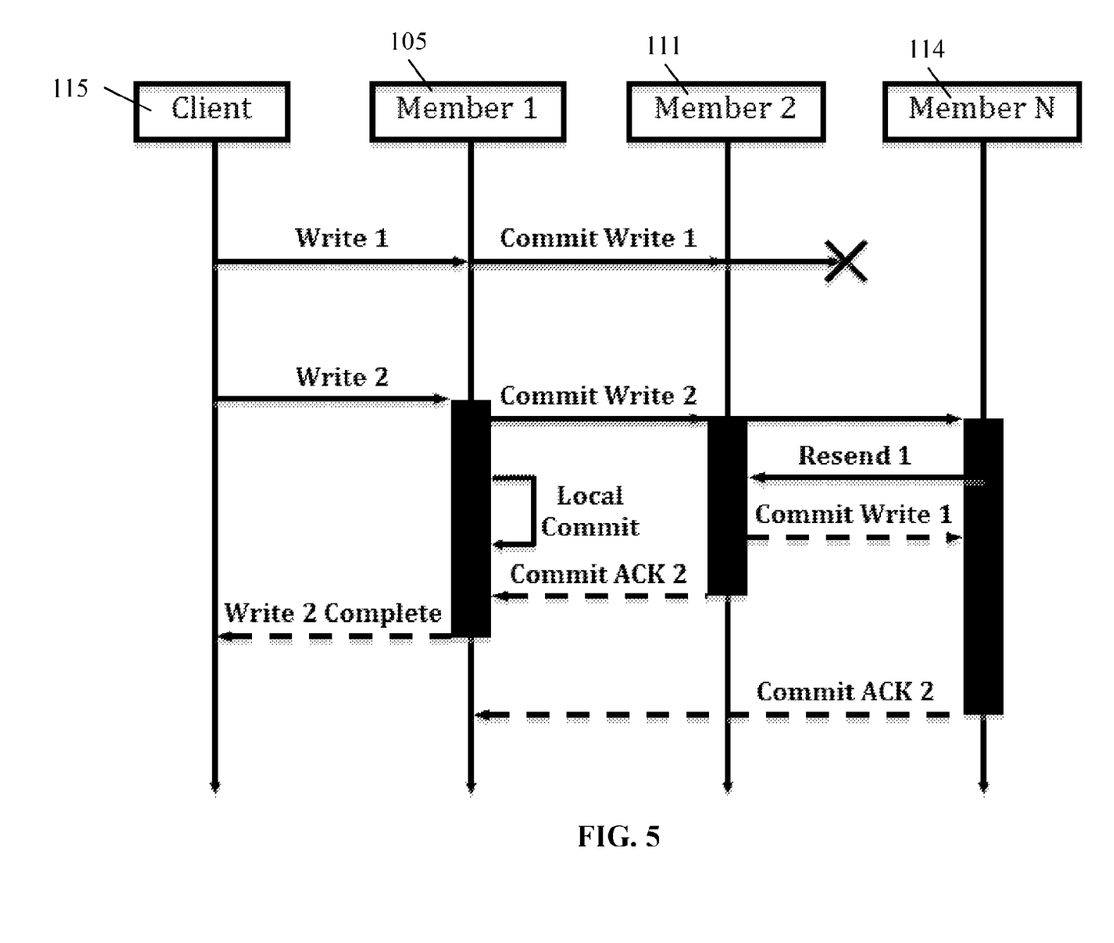
FIG. 5 is an exemplary diagram depicting asynchronous processing of a write request by the cluster of FIG. 1 in accordance with an embodiment of the present invention, when a cluster member cannot satisfy a write request upon receipt.

Before talking about FIG. 5, it is instructive to discuss additional housekeeping that is valuable when processing by members of a cluster is asynchronous. We mentioned previously that in FIG. 1, the primary member 105 sends a copy of the write request (i.e., "Commit Write" in FIG. 1) and its commit identifier to all of the secondary members in the cluster. Meanwhile, each secondary member is reporting to the primary member each time a write request has been completed by that secondary member. Accordingly, in some embodiments, the primary member 105 correlates the Commit Write request with the commit identifiers whose associated write requests are necessary to satisfy the request. The primary member 105 sends these commit identifiers with the request. For example, the client's write request may depend on one or more previous write requests. The write request may be an instruction to overwrite the value stored in Address1 with an increment to that value. The write request may be an instruction to overwrite the value stored in Address1 with the sum of values stored in Address1 and Address3. For a cluster member to satisfy the request, the logical state of its local storage space must be sufficiently current with respect to the entries whose values affect the result of the commit write.

In some embodiments, the primary member 105 identifies the commit identifiers based on the stored associations between entries in the storage space and commit identifiers. For example, the primary member 105 may have previously associated commit identifiers x0001, x0003, and x0004 with Address1 and associated commit identifier x0002 with Address 2 in memory. If the Commit Write is a request to increment the value in Address1, the primary member 105 may correlate commit identifiers x0001, x0003, and x0004 with the Commit Write request. The primary member 105 may send the Commit Write request to secondary members with a message that the write requests associated with commit identifiers x0001, x0003, and x0004 are necessary to satisfy the Commit Write.

When a secondary member (e.g., Member 2, Member N) of the cluster 100 receives the Commit Write, the secondary member determines whether it can satisfy the request. In some embodiments, the secondary member compares the received request's commit identifier with the most recent commit identifier in the secondary member's log. If the request's identifier is the next identifier in sequence, the secondary member determines that it can satisfy the local commit. In other embodiments, the secondary member compares the commit identifiers in its log with the commit identifiers that have been correlated with the Commit Write. If the correlated commit identifiers appear in the secondary member's log, the secondary member determines that, given the logical state of its local storage space, the secondary member can satisfy the Commit Write.

The secondary member modifies data in its local storage space according to the Commit Write and stores the associated commit identifier in its log. Once the secondary member finishes writing data to its local storage space, the secondary member returns a message indicating that the Commit Write has been completed (i.e., "Commit ACK").

FIG. 5 is an exemplary diagram depicting asynchronous processing of a write request by the cluster of FIG. 1 in accordance with embodiment of the present invention, when a cluster member cannot satisfy a write request upon receipt. In these situations, when the primary member 105 previously attempted to send a first write request and its commit identifier, the secondary member may have had a communication break that rendered it unavailable. The attempted transmission(s) from primary member 105 may have timed out before the network was restored and the secondary member became available again. As a result, the secondary member does not receive the first write request or its associated commit identifier, does not apply the first write request to its local storage space, and does not record the commit identifier in its log. Further, the secondary member's logical state with respect to the entry or entries in the first write request becomes out of date.

When the secondary member receives a subsequent write request correlated with the missing commit identifier, the secondary member cannot satisfy the request. The secondary member requests from at least one other cluster member a copy of the write request associated with the missing commit identifier. Once the secondary member receives the write request, the secondary member applies to the write request to its local storage space and records the missing commit identifier in its log. With its local storage space brought to a logical state with respect to the entry in the newly received write request, the secondary member can satisfy the request.

In this example, the client 115 sends a first write request (i.e., "Write 1") to primary member 105 (shown as Member 1 in FIG. 5). Member 1 assigns commit identifier x0001 to the write request and modifies data in its local storage space accordingly. Member 1 also sends a copy of the write request (i.e., "Commit Write 1" in FIG. 5) and the commit identifier x0001 to the secondary members in the cluster (identified as Member 2 and Member N in FIG. 5). When Member 1 sends Commit Write 1 and commit identifier x0001 to the secondary members, Member 1 can communicate with Member 2. Since Member 2 is available, Member 2 applies the Commit Write 1 request to its local storage space, stores commit identifier x0001 in its log, and stores a copy of Commit Write 1. However, Member N experiences a communication breach, rendering Member N disconnected and unavailable to the primary member 205. Since Member 1 cannot communicate with Member N, Member N does not receive the Commit Write 1 request or its associated commit identifier x0001. Thus, the logical state of Member N's local storage space becomes out of date with respect to the entry in the Commit Write 1 request.

The client 115 later sends a second write request (i.e., "Write 2") to the cluster 200. Acting on the Write 2 request, Member 1 assigns commit identifier x0002 to Write 2 and modifies data in its local storage space accordingly. Member 1 determines that the Write 2 request is correlated with the storage space entry modified by the Write 1 request. Because applying the Write 1 request to a storage space is necessary to satisfy the Write 2 request, Member 1 correlates the Write 2 request with the Write 1 request's commit identifier, i.e., x0001. In some embodiments, the Member 1 sends a copy of the Write 2 request (i.e., "Commit Write 2" in FIG. 5) and the commit identifier x0002 to the other cluster members, Member 2 and Member N. In some embodiments, Member 1 also sends the commit identifier(s) for which associated write requests need to be applied to the cluster member's local storage space to attain the logical state for accurately applying Commit Write 2. Thus, Member 1 would also send commit identifier x0001.

When Member 2 receives the Commit Write 2 request, Member 2 determines if it can satisfy the request. In some embodiments, Member 2 compares the commit identifier for the Commit Write 2 request with the most recent commit identifier in its log. For example, because Member 2 received Commit Write 1, its log includes commit identifier x0001. Because commit identifier x0002 is the next sequential identifier, Member 2 determines that its local storage space is in a current logical state with respect to the storage space entry in the Commit Write 2 request. Thus, Member 2 applies the Commit Write 2 request to its local storage space, stores commit identifier x0002 in its log, and reports to Member 1 that it has completed Commit Write 2 (such report marked "Commit ACK 2" in FIG. 5).

In other embodiments, to determine if Member 2 can satisfy the request, Member 2 receives from Member 1 the commit identifier(s) correlated with the Commit Write 2 request. Member 2 searches its log for each commit identifier. For example, Member 1 may inform Member 2 that the Commit Write 2 request is correlated with commit identifier x0001. Member 2 searches its log for this identifier. When Member 2 finds commit identifier x0001 in its log, Member 2 determines that it can satisfy the request and applies the Commit Write 2 request, as described herein.

Similarly, when Member N receives the Commit Write 2 request, Member N determines if it can satisfy the request. In some embodiments, Member N compares the commit identifier for the Commit Write 2 request with the most recent commit identifier in its log. In this example, Member N's log is empty because it has not received any write requests. Member N may store the expected value of the first commit identifier in the sequence and the expected increment(s) between identifiers. For example, the expected first commit identifier may be x0001, and subsequent identifiers may be incremented by 1. Since Member N does not have any commit identifiers in its log and commit identifier x0002 is not the expected first identifier, Member N can conclude that it has not received at least one previous write request (i.e., the request associated with commit identifier x0001). Thus, Member N determines that its local storage space is not in a logical state sufficiently current for satisfying the request.

Let us summarize the processes discussed so far in connection with FIG. 5. In this figure, the client Write 1 request is received by primary Member 1 and passed on to each of Member 2 and Member N. However, we have assumed in this figure that the Write 1 request (marked "Commit Write 1" in FIG. 5) never reaches Member N, owing to the erratic nature of the network. Next the primary Member 1 receives the Write 2 request from the client, and the primary passes on the request (marked "Commit Write 2" in FIG. 5) on to secondary Member 2 and secondary member N. As discussed, each of Member 2 and Member N has received, from the primary Member 1, the commit identifier(s) correlated with the Commit Write 2 request. To determine whether Member N can satisfy the request, Member N searches its log for the commit identifier(s). For example, Member N may receive information that the Commit Write 2 request is correlated with commit identifier x0001. Member N searches its log for commit identifier x0001. Because this commit identifier is missing from its log, Member N determines that it cannot satisfy the Commit Write 2 request. In FIG. 5, therefore, Member N needs to obtain the write request for the missing commit identifier so that Member N can attain a current logical state for its local storage space, with respect to the Commit 2 request. Member N therefore sends a request to Member 2 for the write request associated with missing commit identifier x0001 (marked "Resend 1" in FIG. 5). Member 2 accesses its log for Commit Write 1 and sends the Commit Write 1 request to Member N. Member N then applies the Commit Write 1 request to its local storage space and stores commit identifier x0001 in its log.[1] Because Member N's local storage space has attained a sufficient logical state for satisfying the Commit Write 2 request, Member N then applies Commit Write 2 request to its storage space. When Member N finishes modifying its local storage space, Member N reports to Member 1 that the Commit Write 2 request has been satisfied (such report marked "Commit ACK 2" in FIG. 5).

[1] After executing Commit Write 1, member N reports to primary Member 1 that member N has carried out the request, and therefore sends to Member 1 "Commit ACK 1". This activity is omitted from FIG. 5 for the sake of simplicity in the drawing.

While in the embodiment of FIG. 5 Member N requests a copy of the write request associated with commit identifier x0001 from secondary Member 2, in another embodiment, Member N sends the request to primary Member 1 since Member 1 receives and applies all of the write requests to its local storage space, thereby attaining the most current logical state(s) for all of its entries. In another embodiment, Member N requests a copy of the write request from two or more members. For example, Member N may broadcast its request to all of the other cluster members, i.e., in this embodiment, both Member 1 and Member 2. When a member responds, Member N applies the received write request to its local storage space and stores the associated commit identifier x0001 in its log. When Member N receives an additional copy of the write request from the other member, Member N determines it has already applied the write request and disregards the copy.

In some embodiments, a member that receives a request for Commit Write 1 may not have received Commit Write 1, either. For example, commit identifier x0001 may also be missing from the member's log. The member may forward the request for Commit Write 1 to another cluster member, preserving the identity of the member making the original request. In some embodiments, cluster members may store records of requests for write requests submitted by other cluster members. When a member receives a forwarded request, the member compares the forwarded request to the requests it has already received. If the forwarded request is a duplicate, the member disregards the forwarded request.

Although, in the example described above, Member N's log was empty when Member N received the Commit Write 2 request, in various embodiments, Member N may have stored commit identifiers for other write requests. Member N may store the expected increment(s) between commit identifiers (e.g., increments of 1, 5, etc.). Based on the number of increments between the most recent commit identifier in Member N's log and the Commit Write 2 request's commit identifier, Member N can determine whether commit identifiers are missing from the log. Further, Member N can identify the missing commit identifiers and request their associated write requests from other cluster members.

In some embodiments, when a member cannot satisfy a write request upon receipt, the member waits until other members provide additional write requests for attaining the logical state of the member's local storage space for satisfying the write request. Then, the member satisfies the write request. Other members may provide the additional write requests when the members synchronize their local storage spaces according to a schedule, as described in more detail below.

In various embodiments, when the write requests associated with commit identifiers necessary to satisfy a request have not been applied to a cluster member, the cluster member causes one of the other members to satisfy the request; causes one or more other members to provide the missing write requests so the member itself can satisfy the request; or waits for other members to provide the missing write requests so that the member itself can satisfy the request, according to, for example, a scheduled synchronization period. The cluster member selects one of these options based on, among other things, the member's storage unit activity, processor load, network bandwidth available, memory available, thermal conditions, electrical power consumption, configuration settings, or other factors, in any combination.

Figure 6:
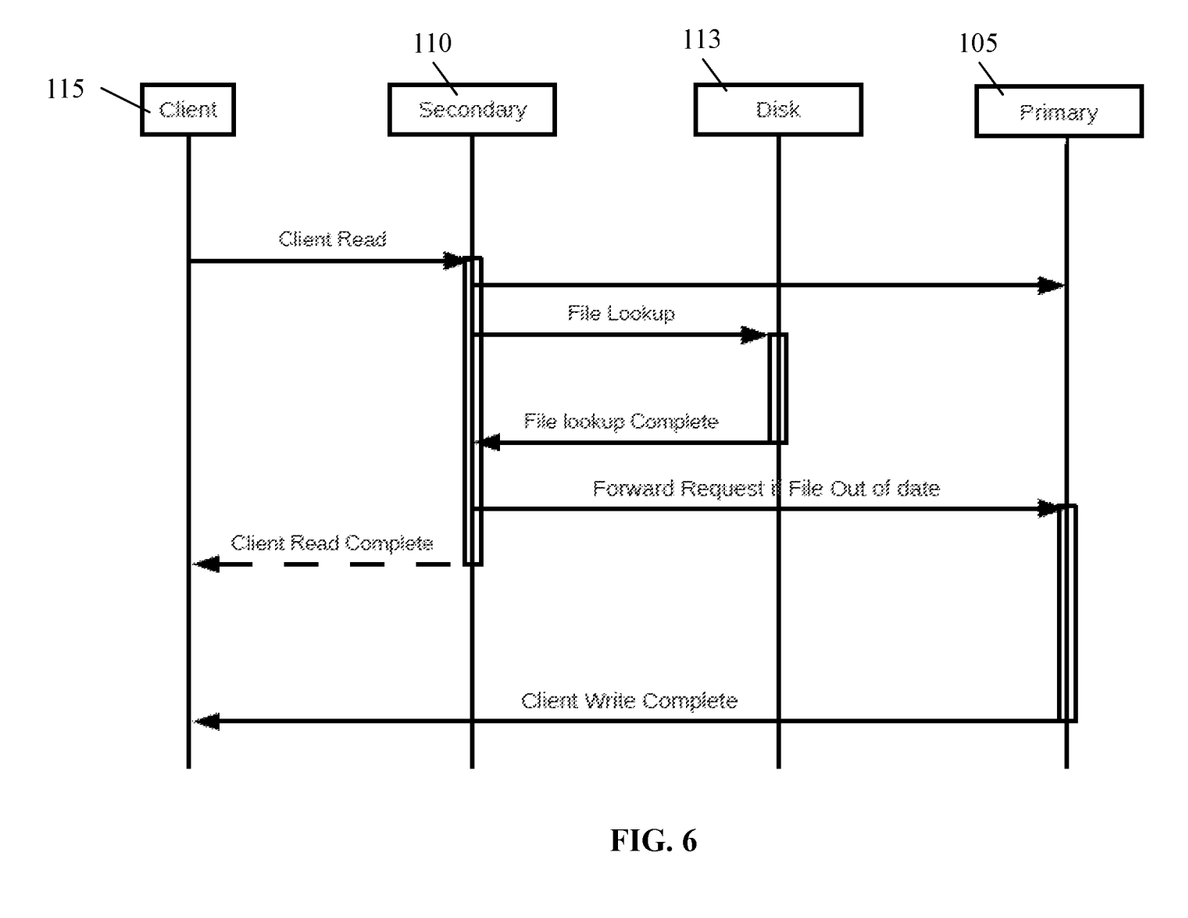
FIG. 6 is a diagram depicting asynchronous processing of a read request by the cluster of FIG. 1 in accordance with an embodiment of the present invention.

FIG. 6 is a diagram depicting a asynchronous processing of a read request by the cluster of FIG. 1 in accordance with an embodiment of the present invention. When a client 115 sends a read request to the cluster 100, any member of the cluster 100 may handle the request (i.e., retrieve the data from storage and respond to the client 160), because responding to a read request does not involve making any change in state of storage. The cluster may select the member based on storage unit activity, processor load, network bandwidth available, memory available, thermal conditions, electrical power consumption, or any other parameter.

In this embodiment, a secondary member 110 of the cluster 100 receives the read request (i.e., "Client Read" in FIG. 6). On receipt of the Client Read, the secondary member 110 determines if its local storage space is in a sufficiently current logical state for satisfying the request. For example, the secondary member 110 determines if the most recent commit identifier for the entry in its log is concurrent with the time and date stamp in the Client Read. If so, the secondary member 110 reads data from its local storage space (shown as "File Lookup" and "File Lookup Complete" in FIG. 6), returns the data to the client 15, and reports that the reading has been completed (such report shown as "Client Read Complete" on the dashed line in FIG. 6).

In some embodiments, even though a secondary member 110 has the necessary commit identifiers, the secondary member cannot efficiently satisfy the Client Read. For example, the secondary member may determine it cannot efficiently satisfy the read request based on its storage unit activity, processor load, amount of available network bandwidth, amount of available memory, thermal conditions, electrical power consumption, configuration settings, or any other parameter, in any combination. In such a circumstance, the secondary member forwards the Client Read to one or more other members in the cluster to be satisfied.

In some situations, the secondary member 110 may determine that it cannot satisfy the read request because its local storage space is not in a logical state sufficiently current to for satisfying the request. For example, the most recent commit identifier for the entry in the secondary member's 110 log may pre-date a time and date stamp in the Client Read, or the read request may call for accessing storage space for which the secondary member has yet to complete processing of a write request. In such circumstances, the secondary member 110 forwards the Client Read to another cluster member to be satisfied. In some embodiments, the secondary member 110 forwards the Client Read to the primary member 105, since the primary member 205 receives and applies all of the write requests to its local storage space, thereby attaining the most current logical state(s) for all of its entries. The primary member 105 reads data from its local storage space and returns the data to the client (shown as "Client Read Complete" in FIG. 6). In some embodiments, the secondary member 110 forwards the Client Read to another secondary member or broadcasts the Client Read to all of the other members of the cluster. If a receiving secondary member cannot satisfy the Client Read, the secondary member may forward the Client Read to yet another member of the cluster.

In some embodiments, when the secondary member 110 forwards the Client Read for another member to satisfy, the secondary member 110 nevertheless requests the write request(s) through which its local storage space would attain a logical state that is sufficiently current for satisfying the Client Read. The secondary member 110 sends requests to at least one other cluster member, such as the primary member 105, as described herein. When the secondary member 110 receives the write request(s), the secondary member 110 applies the request(s) to its local storage space and stores the associated commit identifier(s) in its log. Thus, in this asynchronous system, whenever the secondary member 110 determines that the logical state of an entry in its local storage space is out of date, the secondary member 110 obtains the write requests to make the logical state for that entry current. In this manner, over time, the secondary member 110 incrementally updates its local storage space by attaining more current logical states for different entries of the storage space in response to receiving client requests directed to those entries.

In various embodiments, when the secondary member 110 cannot satisfy the Client Read upon receipt, the secondary member 110 does not forward the Client Read to another cluster member. Instead, the secondary member 110 obtains the write requests that would attain a logical state of that is sufficiently current for the member 110 to satisfy the Client Read, as described herein. After the secondary member 110 updates its local storage space, the secondary member 110 returns the requested data from its storage space to the client 115 and reports that the write request has been completed (i.e., "Client Read Complete" in FIG. 6).

In some embodiments, when a member cannot satisfy a read request upon receipt, the member waits until other members provide additional write requests through which the member's local storage space attains a logical state sufficiently current to satisfy the read request. Then, the member satisfies the read request. Other members may provide the additional write requests when the members synchronize their local storage spaces according to a schedule, as described in more detail below.

In various embodiments described herein, a cluster member that has determined its storage space is out of date in seeking to satisfy a client request may invoke one or more other members to obtain information that can be used to make its storage space more current. In further embodiments, cluster members coordinate among themselves to exchange information about the write requests that they have obtained and update their local storage spaces according to missing write requests that they receive. In one example, a secondary member communicates at predetermined intervals with the primary member to synchronize its local storage space with the primary member's. Because the primary member applies all write requests to its local storage space, the primary member maintains its local storage space in the most current logical state. By periodically synchronizing its local storage space with the primary's, the secondary member's local storage space attains the most current logical state at regular intervals, even if the local storage space may reside in out of date logical states during the intervening period(s).

In some embodiments, the secondary member requests a list of all commit identifiers assigned to new write requests since the last synchronization between secondary and the primary members. The secondary member compares the list with the commit identifiers in its log. If any commit identifiers are missing the secondary member requests copies of their associated write requests from the primary member. The secondary member applies these write requests to its local storage space and stores the missing commit identifiers in its log.

In another example, the secondary members have schedules according to which they synchronize their local storage spaces. For a cluster with four members, a secondary member may synchronize with the primary member at Time 1, another secondary member at Time 2, and the remaining secondary member at Time 3, returning to the primary member thereafter. Any schedule to pair members for synchronization may be used. When two members synchronize according to a schedule, each member sends to the other a list of commit identifiers that it has received since the two members last synchronized their local storage spaces. If one member has a commit identifier missing from the other member's log, the member sends the associated write request to the other member, which the other member applies to its local storage space. Thus, all the write requests collectively received by the two members will be applied to the members' local storage spaces. In this manner, when the members synchronize, they may update at least some of their entries, even if their storage spaces are not fully updated.

In various embodiments, when the write requests associated with commit identifiers necessary to satisfy a read request have not been applied to a cluster member, the cluster member causes one of the other members to satisfy the read request; causes one or more other members to provide the missing write requests so the member itself can satisfy the read request; or waits for other members to provide the missing write requests so that the member itself can satisfy the read request, according to, for example, a scheduled synchronization period. The cluster member selects one of these options based on, among other things, the member's storage unit activity, processor load, network bandwidth available, memory available, thermal conditions, electrical power consumption, configuration settings, or other factors, in any combination.

Figure 7:
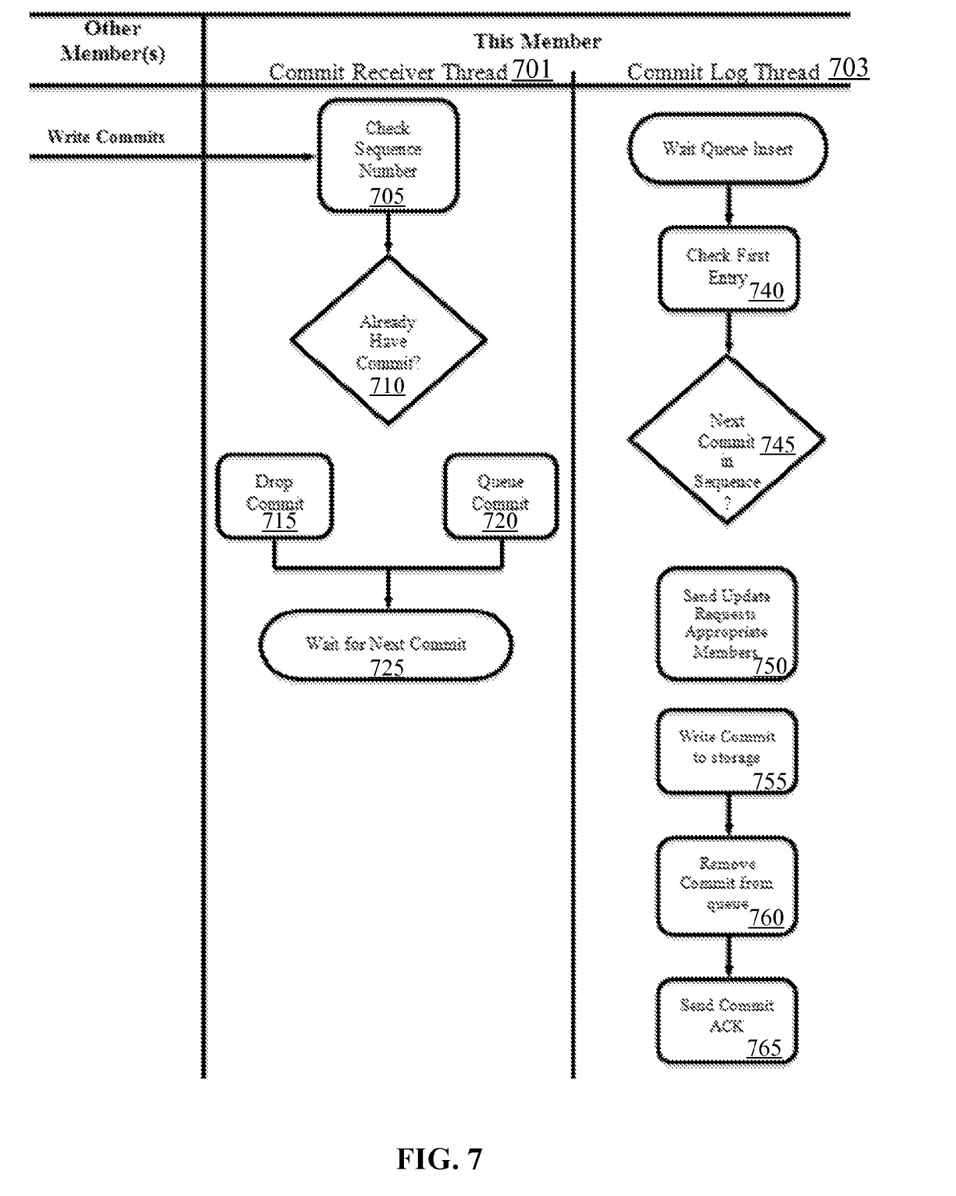
FIG. 7 depicts processing threads running in a member of the cluster of FIG. 1 for processing a write request in accordance with an embodiment of the present invention.

FIG. 7 depicts processing threads running in a member of the cluster of FIG. 1 for processing a write request in accordance with an embodiment of the present invention. The threads include a receiver thread 701 and a log thread 703. The receiver thread 701 manages the write requests that the cluster member receives. The receiver thread 701 may place write requests in a queue in a first in, first out (FIFO) basis. When the cluster member receives a new write request, the receiver thread 701 checks the request's commit identifier against the commit identifiers already present in the queue (step 705). Based on these comparisons, the receiver thread 701 determines if the queue already has a write request with the newly received request's commit identifier (step 710). If the queue has such a write request, the receiver thread 701 disregards the newly received request (step 715). A cluster member may already have a particular write request in its queue when the member requested copies of write requests from the other cluster members, and more than one member has responded. The cluster member stores the first received copy of the write request, but it does not need the copies subsequently received from other members. On the other hand, if the receiver thread 701 does not have the write request, the receiver thread 701 places the write request in the queue (step 720). The receiver thread 801 then waits for the next write request to arrive (step 725).

The log thread 703 processes the write requests in the queue. The member log stores the commit identifiers whose write requests have been applied to the local storage space. From this log, the member can determine the most recent commit identifier. The log thread 703 obtains the first entry in the queue (step 740). The log thread 703 determines if the commit identifier for the entry is the next commit identifier in sequence (step 745). The log thread 703 may compare the entry's commit identifier with the log's most recent commit identifier. If the difference between the identifiers is greater than the increment between sequential identifiers, the log thread 703 determines that one or more intervening write requests have not been applied to the member's local storage space. The log thread 703 identifies the missing commit identifiers and sends requests for their corresponding write requests to at least one other member of the cluster (step 750).

At least one other member sends the missing write requests to the cluster member. The cluster member applies the write requests to its local storage space to update some of the entries therein. The cluster member also stores the commit identifiers of the missing write requests in its log. Now that its local storage space is current, the log thread 703 processes the write request from the queue (step 755). The cluster member modifies data in its local storage space according to the write request. When the writing is completed, the log thread 703 removes the write request from the queue (step 760). The log thread sends a message indicating that the write request has been completed (i.e., "Commit ACK") to the member or client that sent the write request to the cluster member (step 765).

Although the embodiments presented herein have been described in reference to read requests of data in storage and write requests of data to storage, various other embodiments can be directed to any peer-to-peer activities among members in a cluster.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for handling partially inconsistent states among members of a cluster in an erratic storage network that responds to requests from a client, the method comprising:

receiving, at a given member of the cluster, an incoming write request to modify an entry in storage;

assigning a commit identifier to the incoming write request, the commit identifier corresponding to (1) the entry in storage and (2) a particular modification, associated with the incoming write request, of a state of the entry in storage;

correlating the incoming write request with any commit identifier for any previous request necessary to satisfy the incoming write request by (1) identifying at least one entry in storage to be used by the incoming write request, and (2) determining any commit identifier associated with the at least one identified entry;

detecting, on the given member of the cluster, whether commit identifiers for any previous request necessary to satisfy the incoming write request have been applied to the given member; and if the commit identifiers necessary to satisfy the incoming write request have been applied to the given member, then satisfying the incoming write request; and if the commit identifiers necessary to satisfy the incoming write request have not been applied to the given member, then performing at least one of the following processes:

(i) asynchronously causing one or more other members to provide to the given member the missing commit identifiers to satisfy the incoming write request, so that the given member can satisfy the incoming write request; and (ii) waiting until the given member has been caused to receive the missing commit identifiers to satisfy the incoming write request, so that the given member can satisfy the incoming write request.

2. The method for handling partially inconsistent states according to claim 1, wherein
if the commit identifiers necessary to satisfy the incoming write request have not been applied to the given member, then using a set of selection criteria to determine which one or more of processes (i) and (ii) shall be performed.

3. The method according to claim 2, wherein the set of selection criteria includes one or more of the following criteria associated with the given member of the cluster or any other member of the cluster: storage unit activity, processor load, network bandwidth available, memory available, thermal conditions, and electrical power consumption, and configuration settings.

4. The method according to claim 1, further comprising:
sending, by a primary member, copies of the incoming write request to secondary members of the cluster.

5. The method according to claim 1, wherein (i) asynchronously causing one or more other members to provide to the given member the missing commit identifiers further comprises:
sending, to at least one other member of the cluster, a request for the missing commit identifiers.

* * * * *